United States Patent
Matsubara et al.

(10) Patent No.: US 7,169,480 B2
(45) Date of Patent: Jan. 30, 2007

(54) CLAD PIPE

(75) Inventors: Yoichi Matsubara, Kawasaki (JP); Akihiro Takeya, Kawasaki (JP); Seiichiro Miyata, Shimonoseki (JP)

(73) Assignee: Dai-Ichi High Frequency Co., Ltd., Tokyo (JP)

( * ) Notice: Subject to any disclaimer, the term of this patent is extended or adjusted under 35 U.S.C. 154(b) by 3 days.

(21) Appl. No.: 11/046,828

(22) Filed: Feb. 1, 2005

(65) Prior Publication Data

US 2005/0166987 A1   Aug. 4, 2005

(30) Foreign Application Priority Data

Feb. 2, 2004 (JP) ............................. 2004-024951
Dec. 1, 2004 (JP) ............................. 2004-348161

(51) Int. Cl.
B32B 1/08 (2006.01)
B32B 15/04 (2006.01)
B32B 15/18 (2006.01)

(52) U.S. Cl. .................. 428/680; 428/34.1; 428/667; 428/681; 428/615; 166/242.4

(58) Field of Classification Search ............ 428/615, 428/680, 666, 667, 681, 684, 685, 34.1, 35.7, 428/35.8, 35.9; 166/242.1, 242.4
See application file for complete search history.

(56) References Cited

U.S. PATENT DOCUMENTS 4,754,911 A * 7/1988 Turner ..................... 228/131

FOREIGN PATENT DOCUMENTS

JP   06-142948   5/1994

OTHER PUBLICATIONS

The Japan Research and Development Center for Metals Report, Demonstration Technique in Actual Field under Corrosive Environment, Aug. 1, 2000.

* cited by examiner

Primary Examiner—Michael E. Lavilla
(74) Attorney, Agent, or Firm—Westerman, Hattori, Daniels & Adrian, LLP.

(57) ABSTRACT

A clad pipe includes an external layer and a coating layer made of Ni base anticorrosion alloy. Both end portion areas of the coating layer are formed by a build-up welded layer (Ni base alloy of composition 1) on the inner surface of the external layer. Other areas are formed by a Ni base alloy layer (Ni base alloy of composition 2) fusion-bonded to the build-up welded layers and the inner surface of the pipe, a solidus-curve temperature of the Ni base alloy layer being 1300° C. or below and lower than a solidus-curve temperature of the Ni base alloy formed by build-up welding by 150° C. or more. Composition 1 and composition 2 are adjusted so that, in the same environment, corrosion resistance of the Ni base alloy of composition 1 is equivalent to or superior to that of the Ni base alloy of composition 2.

18 Claims, 4 Drawing Sheets

1 External Layer

Machined Portion

FIG.7

1 External Layer

Build-Up Layer

FIG.8

Screw Cutting

1 External Layer

FIG.9

Welding

1 External Layer

Joint

CLAD PIPE

This application claims priority under 35 U.S.C.§119 to Japanese Patent Application No. 2004-24951 filed on Feb. 2, 2004 and Japanese Patent Application No. 2004-348161 filed on Dec. 1, 2004, the entire disclosure of which are incorporated herein by reference in their entireties.

FIELD OF THE INVENTION

The present invention relates to a structure of a clad pipe excellent in corrosion resistance, and more specifically to a structure of a clad pipe with an inner surface covered by Ni-base alloy excellent in corrosion resistance against hydrogen sulfide, etc., which is preferably used as, for example, an oil pipe and an oil well tubular. In this disclosure, the wording of "%" used to define alloy composition denotes "mass %".

BACKGROUND OF THE INVENTION

It is known that oil and gas fields, rich in corrosive components, such as hydrogen sulfide, lie under the ground. In an oil well pipe including an oil pipeline/oil well tubular used to mine or transport oil and/or gas containing corrosive components (hereinafter referred to as "crude oil") and a drill pipe for boring the ground while supplying mud slurry containing corrosive components, it is required that the inner surface of such a pipe, to which the aforementioned corrosive fluid continuously contacts while being renewed, has corrosion resistance against those corrosive components.

In view of this, it is preferable to use a high alloy pipe for the aforementioned oil well pipe. However, forming the entire thickness of the pipe by high alloy causes significantly increased cost, and therefore a clad pipe (double pipe), or a carbon steel pipe with an inner layer made of high alloy, has been normally used.

In conventional clad pipes, there are generally two types of structures. One such structure is disclosed, for instance, in JRCM NEWS/Vol. 166, published by Judicial Foundation of Material Research and Development Center, wherein a high Ni alloy with high corrosion resistance build-up is welded on an inner surface of a carbon steel pipe. One problem associated with this structure (i.e., build-up welding) is that since the build-up welding is performed on the inner surface of a long pipe, bending of the pipe occurs. Another problem is that, in the case of build-up welding, a diluted layer of the base material components and the build-up welding components is formed at the boundary portion between the base material of the steel pipe and the build-up welded layer. In order to form a build-up welding layer containing prescribed components with a predetermined thickness, it is necessary to further build-up a welding layer corresponding to the thickness of the diluted layer, which increases cost. Still another problem is that, due to the existence of the diluted layer, there is no clear boundary between the base material and the build-up welded layer. As a result, it is difficult to measure the wear status of the build-up welding layer from the outside of the pipe in a nondestructive manner. Another such structure is disclosed, for instance, in Japanese Unexamined Laid-open Patent Publication H06-142948, wherein a high Ni alloy pipe with high corrosion resistance is fitted in a carbon steel pipe and welded to the inner surface. With this structure, there must not be a gap between the inner pipe and the outer pipe when the inner pipe is inserted in the outer pipe to secure them. Because of this, it is required to strictly control processing tolerance of the inner and outer diameters thereof, which in turn increases manufacturing costs. Another problem with this structure is that it is difficult to manufacture a long article.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The present invention addresses the above described conditions and/or other problems in the related art. An object of some embodiments of the present invention is to provide a clad pipe with a new structure excellent in corrosion resistance and preferably used as an oil well pipe which will be exposed to corrosive components including hydrogen sulfide as a main component, wherein the wear status of the inner coating layer of the pipe can be measured from the outside of the pipe in a nondestructive manner. Also, an object of some embodiments of the present invention is to provide a clad pipe with new structure capable of easily connecting with each other by welding to obtain a long pipe having a desired length.

According to the present invention, in order to attain the above objects, one embodiment of the present invention provides a clad pipe having an external layer constituted by a carbon steel pipe or a low alloy steel pipe, and a coating layer made of Ni base anticorrosion alloy for coating an inner surface of the external layer. Both end portion areas of the coating layer are formed by a build-up welded layer (Ni base alloy of composition 1) on the inner surface of the external layer, wherein an area other than the build-up welded layers is formed by a Ni base alloy layer (Ni base alloy of composition 2) fusion-bonded to the build-up welded layers and the inner surface of the pipe. According to this embodiment, a solidus-curve temperature of the Ni base alloy layer is 1300° C. or below and lower than a solidus-curve temperature of the Ni base alloy formed by build-up welding by 150° C. or more. Also, the composition 1 and the composition 2 are adjusted so that corrosion resistance of the Ni base alloy of the composition 1 is equivalent to or superior to corrosion resistance of the Ni base alloy of the composition 2 under the same use environment.

Another embodiment of the present invention provides a clad pipe having an external layer constituted by a carbon steel pipe or a low alloy steel pipe, a ring made of Ni base anticorrosive alloy (Ni base alloy of composition 1) and having an inner diameter smaller than an inner diameter of the external layer, that is metallurgically secured to an end portion of the pipe, and a coating layer made of Ni base alloy (Ni base alloy of composition 2), the coating layer coating an inner surface of the external layer and fusion-bonded to the inner surface of the external layer and a welding side end surface of the ring. According to this embodiment, a solidus-curve temperature of the Ni base alloy layer of the coating layer is 1300° C. or below and lower than a solidus-curve temperature of the Ni base alloy forming the ring by 150° C. or more. Also, the composition 1 and the composition 2 are adjusted so that corrosion resistance of the Ni base alloy of the composition 1 is equivalent to or superior to corrosion resistance of the Ni base alloy of the composition 2 under the same use environment.

Another embodiment of the present invention, the Ni base alloy of the aforementioned composition 2 consists essentially of: Cr: 15 to 45%; B: 2.5 to 5.0%; Si: 2.0 to 5.0%; C: 0.2 to 1.5%; Mo: ≦20%; and the balance being Ni and inevitable impurities.

Another embodiment of the present invention, the Ni base alloy of the aforementioned composition 2 consists essentially of: Cr: 30 to 40%; B: 3.0 to 5.0%; Si: 3.0 to 5.0%; C: 0.4 to 0.8%; Mo: 2 to 10%; and the balance being Ni and inevitable impurities.

Another embodiment of the present invention, the Ni base alloy of the aforementioned composition 2 consists essentially of: B: 1.0 to 5.0%; Si: 3.0 to 25.0%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities.

Another embodiment of the present invention, the Ni base alloy of the aforementioned composition 2 consists essentially of: Cr: 0 to 25%; B: 0 to 1.7%; Si: 6 to 25%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities.

Another embodiment of the present invention, the Ni base alloy of the aforementioned composition 1 has any one of the following compositions A to F: (Composition A) Cr: 20.5 to 22.5%; Mo: 8.0 to 10.0%; Fe: 2.0 to 3.0%: Si: ≦1.0%; Mn: ≦1.0%; Nb+Ta: 3.4 to 3.8%; and the balance being Ni and inevitable impurities;(Composition B) Cr: 20.0 to 22.0%; Mo: 8.0 to 9.0%; Fe: 7.0 to 8.0%: Ti: 1.3 to 1.7%: Si: ≦1.0%; Mn: ≦1.0%; Nb+Ta: 3.3 to 3.7%; and the balance being Ni and inevitable impurities; (Composition C) Cr: 20.5 to 22.5%; Mo: 2.0 to 2.4%; Fe: 29.0 to 31.0%: Cu: 2.0 to 2.4%: Si: ≦1.0%; Mn: ≦1.0%; Ti: 0.8 to 1.0%; and the balance being Ni and inevitable impurities; (Composition D) Cr: 20.0 to 22.0%; Mo: 2.0 to 4.0%; Fe: 27.0 to 29.0%: Cu: 1.6 to 2.0%; C: ≦0.01%; Ti: 2.0 to 2.2%; and the balance being Ni and inevitable impurities; (Composition E) Cr: 15.5 to 17.5%; Mo: 16.0 to 18.0%; W: 3.75 to 5.25%; Fe: 4.5 to 7.0%: Co: ≦2.5%; Si: ≦1.0%; Mn: ≦1.0%; C: ≦0.12%; V: 0.2 to 0.4%; and the balance being Ni and inevitable impurities; and (Composition F) Cr: 14.5 to 16.5%; Mo: 15.0 to 17.0%; W: 3.0 to 4.5%; Fe: 4.0 to 7.0%: Co: ≦2.5%; Si: ≦0.05%; Mn: ≦1.0%; C: ≦0.02%; V: ≦0.35%; and the balance being Ni and inevitable impurities.

According to another embodiment of the present invention, an external peripheral surface of the clad pipe is coated with resin.

According to another embodiment of the present invention, an external peripheral surface of the clad pipe is coated with heat-resisting and corrosion-resisting metal.

According to another embodiment of the present invention, the clad pipe is a pipe to be used as an oil well pipe.

One effects of the present invention is that the clad pipe is excellent in corrosion resistance against hydrogen sulfide. Another effect is that the clad pipe is less expensive than a pipe entirely made of high alloy. Another effect is that the clap pipes can be easily welded to obtain a long tube having a desired length (for example, screw joint can be performed.) Another effect is that the ware status of the inner coated layer of the clad pipe can be measured from the outside of the pipe in a nondestructive manner.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, wherein.

DETAILED DESCRIPTION OF THE INVENTION

Embodiments of the invention will be described hereinafter with reference to the accompanying figures. It should be understood based on this disclosure that various other modifications can be made by those in the art based on these illustrated embodiments.

Figure 1:
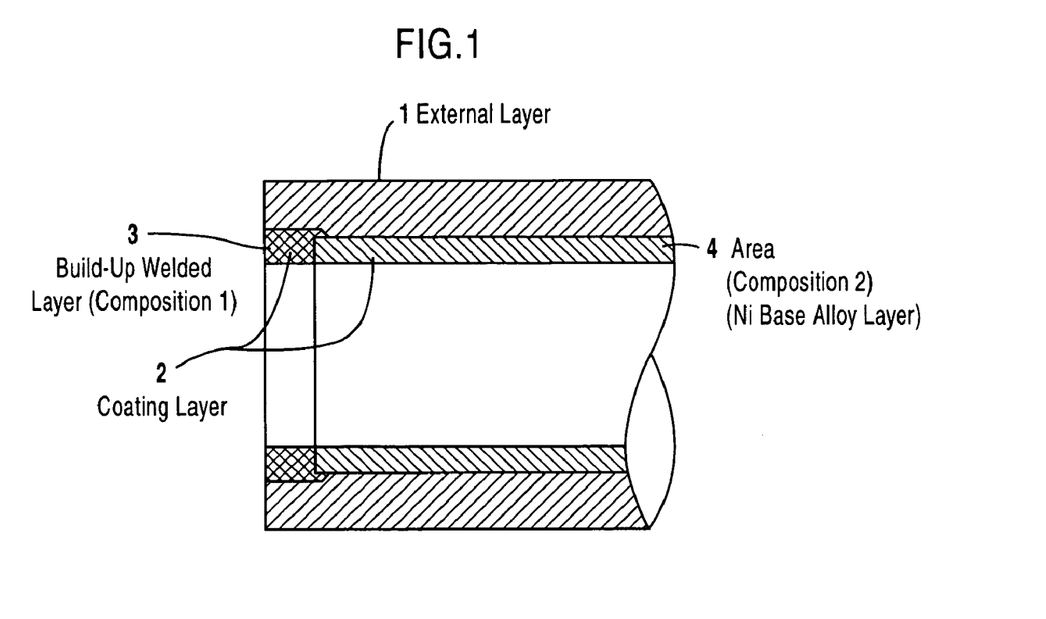
FIG. 1 is an explanatory cross-sectional view showing a clad pipe according to an embodiment of the present invention.
Figure 2:
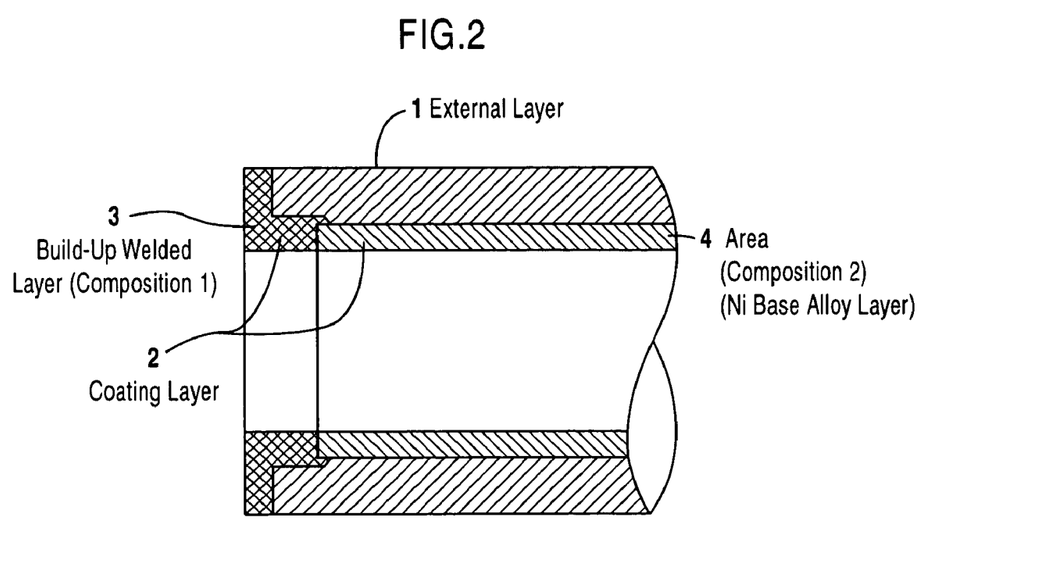
FIG. 2 is an explanatory cross-sectional view showing a clad pipe according to another embodiment of the present invention.
Figure 3:
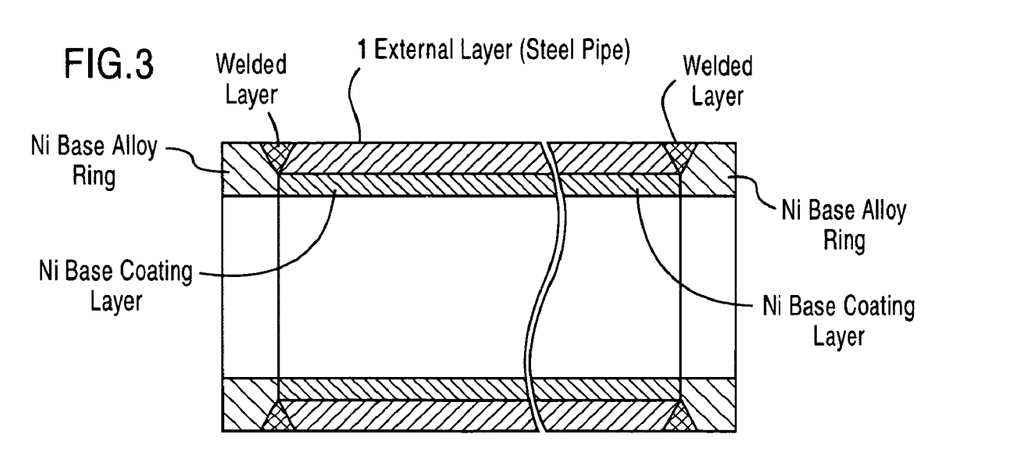
FIG. 3 is an explanatory cross-sectional view showing a clad pipe according to still another embodiment of the present invention.

FIGS. 1 to 3 are explanatory views showing basic structures of clad pipes according to preferred embodiments of the present invention. In FIGS. 1 and 2, an external layer 1 is constituted by a carbon steel pipe or a low alloy steel pipe, and a clad layer 2 is made of Ni base anticorrosion alloy. The both end portions of the clad layer 2 are formed by build-up welding (Ni base alloy of composition 1).

The section (area 4) of the clad layer 2 located between the build-up welded layers 3 formed at both end portions of the tube is made of Ni base alloy (Ni base alloy of composition 2) having a composition in which solidus-curve temperature is 1300° C. or less and lower than the solidus-curve temperature of the Ni base alloy (Ni base alloy of composition 1) formed by build-up welding by 1500° C. or more. The section (area 4) has a structure in which the section is fusion-bonded to the build-up welded portions 3 and the internal surface of the external layer 1. The composition 1 and the composition 2 are adjusted so that the corrosion resistance of the Ni base alloy of the composition 1 is equal to or superior to the corrosion resistance of the Ni base alloy of the composition 2 under the same use environment.

When fluid (e.g., crude oil) flows through the clad pipe, the entire clad layer 2 formed on the internal periphery of the clad pipe, or the build-up welded layer 3 of composition 1 and the area 4 of the composition 2, will be exposed to the same fluid atmosphere. "Corrosion resistance in the same use environment" in this disclosure means "corrosion resistance when exposed to the same fluid environment", and the fluid environment denotes fluid (like crude oil) environment containing corrosive components such as, primarily, hydrogen sulfide.

Furthermore, in the present invention, "fusion-bond" means that bonding essentially by wetting by merely forming a diluted layer tens of μm in thickness in which the material of the external layer (steel pipe) and that of the build-up welded layer 3 are mixed between the external layer (steel pipe) and that of the build-up welded layer 3. In other words, formed between the Ni base alloy layer of the composition 2 and the external layer 2 is a joint boundary surface which does not exist a diluted layer having a thickness which may prevent nondestructive measurement.

Accordingly, a clear boundary exists between the Ni base alloy layer of the composition 2 and the build-up welded layer 3/the external layer 1, so that the thickness of the Ni base alloy layer of the composition 2 can be measured from the outside of the pipe in a nondestructive manner. As a result, the wear status of the tube can be measured during use from the outside of the tube in a nondestructive manner.

The wear status of the build-up welded layer cannot be measured from the outside of the tube in a nondestructive manner since a diluted layer caused by welding exists between the build-up welded layer and the external layer pipe. However, in cases where the wear status due to corrosion, i.e., the corrosion resistance, is adjusted such that the corrosion resistance of Ni base alloy of the composition 1 is equivalent to or superior to ($\geqq$) that of Ni base alloy of the composition 2, it is enough to know the thickness of the Ni base alloy of the composition 2 without knowing the thickness of the build-up welded layer 1. Because of the reasons mentioned above, in the present invention, the corrosion resistance of the Ni base alloy of the composition 1 is set to be equivalent to or superior to the corrosion resistance of the Ni base alloy of the composition 2.

An embodiment for forming the clad layer 2 on the inner peripheral surface of the external layer 1 is explained as follows. Initially, at both end portions of the inner peripheral surface of the external layer pipe 1, Ni base anticorrosion alloy (Ni base alloy of the composition 1) is build-up welded. Basically, the build-up welding is performed at both end portions of the inner peripheral surface of the external layer pipe with a width of tens of mm in the longitudinal direction of the pipe. However, depending on the material characteristics requiring in the welding portions, the build-up welding can also be performed to the end surfaces of the external layer pipe if necessary.

As for the thickness of the build-up welded layer, it is enough that a welded portion raised from the inner peripheral surface of the external layer pipe has a thickness of about 5 to 15 mm after welding and machining. Since a diluted layer exists between the base material (i.e., external layer made of carbon steel or low alloy steel) and the build-up welded layer, in the actual welding, it is required to form a build-up welded layer having a thickness obtained by adding the thickness of the diluted layer to the machining thickness.

Figure 4:
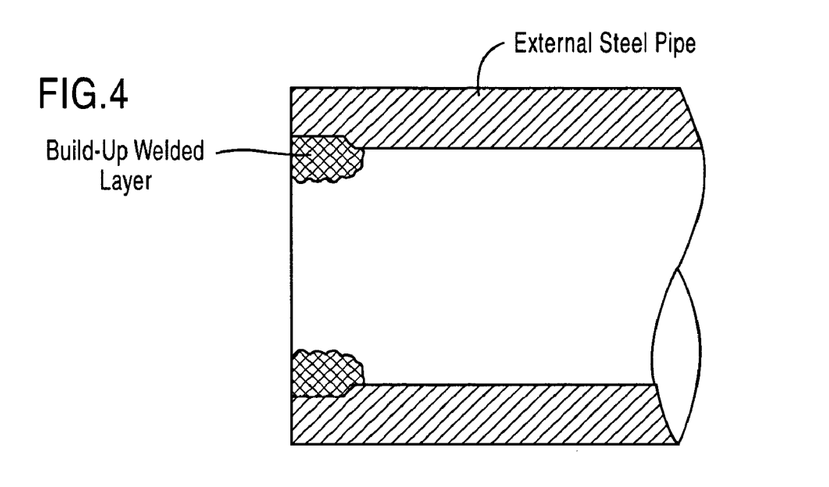
FIG. 4 is an explanatory cross-sectional view showing the state in which build-up welded portion was formed.

After the welding, weirs (dams) formed by the build-up welding exist at both end portions of the inner peripheral surface of the pipe 1. FIG. 4 is an explanatory view showing the weirs (dams) formed by the build-up welding.

As the alloy to be build-up welded (Ni base alloy of the composition 1), it is preferable to use an existing high anticorrosion Ni base alloy such as Inconel 625, Inconel 725, Incoloy 825, Incoloy 925, Hastelloy C or Hastelloy C-276, or another high anticorrosion Ni base alloy having corrosion resistance equal to or superior to the corrosion resistance of the aforementioned existing high anticorrosion Ni base alloy and also having a solidus-curve temperature equal to or higher than that of the aforementioned existing high anticorrosion Ni base alloy (i.e., higher in temperature at which the alloy starts to melt.)

After correcting the dimension of the build-up welded portions (weirs) by machining, molten Ni alloy of the composition 2 is injected into the space defined by the weirs to thereby fusion-bond the molten alloy and the welded portions/the inner peripheral surface of the external layer steel pipe.

In the structure shown in FIG. 3, instead of forming weirs (dams) by build-up welding as shown in FIGS. 1 and 2, weirs (dams) are formed by metallurgically joining rings made of Ni base alloy (Ni base alloy of the composition 1) to both end surfaces of the external layer steel pipe 1. The inner diameter (radius) of each ring is smaller than the inner diameter (radius) of the external layer steel pipe by the thickness of the Ni base alloy layer of the composition 2. The Ni base layer of the composition 2 is fusion-bonded to the rings in the same manner as in the structure shown in FIGS. 1 and 2.

As a method for metallurgically joining the rings to both end surfaces of the external layer steel pipe 1, welding (arc welding, electron beam welding, etc.) or pressure welding (friction pressure welding, etc.) can be employed. As for the ring, a cast article made of material equivalent to the material of the build-up welded layer as shown in FIGS. 1 and 2, a forged article, a welded article (e.g., formed by curving a plate into a pipe shape and welding the abutted portions), or a ring shaped article formed by cutting a plate can be preferably used. Instead of the ring in which the entire thickness is made of Ni alloy of the composition 1, it is possible to use a ring with the external peripheral portion made of carbon steel or low alloy steel.

Figure 5:
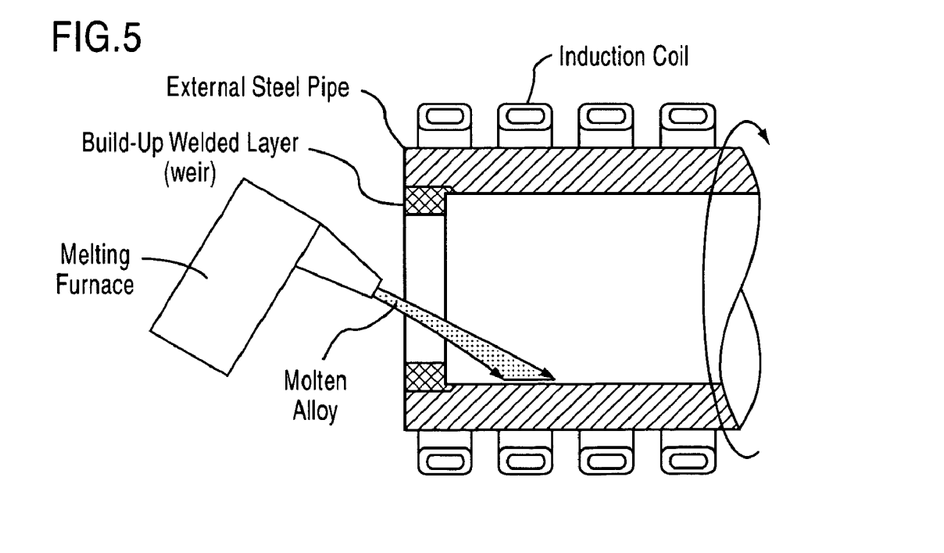
FIG. 5 is an explanatory cross-sectional view showing a method for thermally welding molten alloy on a surface of a pipe.

FIG. 5 depicts a method for fusion-bonding the Ni base alloy layer of the composition 2 to the build-up welded layer (or the ring) and to the inner peripheral surface of the external layer steel pipe 1. In this method, the external layer pipe is disposed horizontally, and the pipe is heated by induction heating or gas fire while being rotated. When the temperature of the pipe reaches a temperature required to fusion-bond the molten alloy (i.e., near the solidus-curve temperature of the molten alloy), the molten alloy is injected into the pipe while rotating the pipe such that the centrifugal force to be applied to the pipe inner peripheral surface becomes 3 G or more by the centrifugal casting principal. As a result, the molten alloy is pressed against the entire pipe inner peripheral surface with even pressure to be fuse-bonded thereto. At this time, the molten alloy is fuse-bonded to the build-up welded layers (or rings.)

After the fuse-bonding of the molten alloy, the molten alloy is cooled while rotating the pipe until the fuse-bonded layer solidifies. The heat treatment of the external layer pipe and the build-up welded layer can also be performed by adjusting the cooling rate after the solidification. By increasing the cooling rate, quenching of the external layer pipe and solution treatment of the build-up welded layer can also be performed. Instead of the above, after the cooling to a normal temperature, the heat treatment of the external layer pipe and the build-up welded layer can be performed.

As mentioned above, in order to measure the wear status of the Ni base alloy layer of the composition 2 (solidified layer of the molten alloy) from the outside of the external layer pipe in a nondestructive manner, a diluted layer in which both materials are mixed should not be formed at the boundary portion between the Ni base alloy layer and the external layer. In other words, it is necessary to fusion-bond the Ni base alloy layer to the inner peripheral surface of the external layer pipe by melting the external layer pipe only at the level of wetting.

To limit the solidus-curve temperature of the Ni base alloy of the composition 2 to 1300° C. or below and set the temperature to be lower than the solidus-curve temperature of the Ni base alloy of the composition 1 of the build-up welded portion (or ring) by 150° C. or more is an essential condition for fusion-bonding the molten alloy to the build-up layer (or ring) and the external layer without causing a thick diluted layer exceeding 100 μm.

If the solidus-curve temperature of the Ni base alloy of the composition 2 exceeds 1300° C., then the diluted layer grows and the external layer pipe melts, thereby resulting in apertures in the pipe, which may cause leakage of the molten alloy through the apertures. Another reason that the solidus-curve temperature of the Ni base alloy of the composition 2 is set to be lower than the solidus-curve temperature of the Ni base alloy of the composition 1 of the build-up welded portion (or ring) by 150° C. or more is that if the temperature difference is 150° C. or less, then the melting of the build-up welded portion (or ring) becomes more severely, thereby making it difficult to maintain the shape of the build-up welded portion (or ring.)

In cases where as the external layer steel pipe 1, a carbon steel pipe having a composition of C ≦0.5% is used, as a low alloy steel pipe, steel material having a composition consisting of Cu: ≦0.5%, Si: 0.15 to 0.35%, Mn: 0.3 to 1.7%, Ni: up to 4.5%, Cr: up to 3.5%, Mo: up to 1.0%, and small amount of active metal elements such as Nb, Ta, Ti and V added according to need, such as nickel chrome molybdenum steel material (JIS SNCM), chrome molybdenum steel material (JIS SCM) or nickel chrome steel (JIS SNC), is used, as the Ni base alloy of the composition 1, high anticorrosion Ni base alloy, such as Inconel 625, Inconel 725, Incoloy 825, Incoloy 925, Hastelloy C or Hastelloy C-276, or another high anticorrosion Ni base alloy having corrosion resistance equal to or superior to the corrosion resistance of the aforementioned existing high anticorrosion Ni base alloy and also having a solidus-curve temperature equal to or higher than that of the aforementioned existing high anticorrosion Ni base alloy, is used, the following alloy composition can be used as the Ni alloy of the composition 2 (composition of molten alloy) which meets the aforementioned solidus-curve temperature conditions and the aforementioned corrosion resistance. The aforementioned conditions of corrosion resistance denote conditions that the corrosion resistance of the Ni base alloy of the composition 1 is set to be equal to or superior to the corrosion resistance of the Ni base alloy of the composition 2 under the same use environment, as mentioned above. The corrosion resistance denotes corrosion resistance under the environment existing corrosive components such as, primarily, hydrogen sulfide.

It is preferable that the composition (Alloy 1) of the Ni base alloy of the aforementioned composition 2 consists essentially of Cr: 15 to 45%, B: 2.5 to 5.0%, Si: 2.0 to 5.0%, C: 0.2 to 1.5%, Mo: □20%, and the balance being Ni and inevitable impurities. All of the Ni base alloy falling within the aforementioned range are inferior in corrosion resistance to high Ni base anticorrosion alloy, such as Inconel 625, Inconel 725, Incoloy 825, Incoloy 925, Hastelloy C and Hastelloy C-276, and meet the aforementioned corrosion resistance conditions. The solidus-curve temperature is 1300° C. or less and lower than that of high Ni base anticorrosion alloy, such as Inconel 625, Inconel 725, Incoloy 825, Incoloy 925, Hastelloy C and Hastelloy C-276 by 150° C. or more. Therefore, it is possible for the alloy to be favorably fusion-bonded to the external layer steel pipe and the build-up welded layer (or ring secured to the end surface.)

With respect to the corrosion resistance in hydrogen sulfide atmosphere, within the aforementioned range, it is preferable that the Ni base alloy of the aforementioned composition 2 consists essentially of Cr: 30 to 40%, B: 3.0 to 5.0%, Si: 3.0 to 5.0%, C: 0.4 to 0.8%, Mo: 2 to 10%, and the balance being Ni and inevitable impurities.

If Cr is less than the lower limit, the corrosion resistance becomes poor. Therefore, it is preferable that the amount of Cr is not lower than the lower limit. On the other hand, if it exceeds the aforementioned upper limit, the melting point raises. As a result, the aforementioned condition of the solidus-curve temperature (solidus-curve temperature is equal to or lower than (≦) 1300° C., and lower than the solidus-curve temperature of the Ni base alloy of the build-up welded portion by 150° C. or more) cannot be met. Thus, it is not preferable.

Although B and Si are essential elements to lower the melting point and keep the wettability at the time of fusion-bonding of molten alloy, an excessive addition thereof exceeding the upper limit causes remarkably brittle material. Therefore it is not preferable. On the other hand, if it is less than the lower limit, the aforementioned condition of the solidus-curve temperature cannot be met. Thus, it is not preferable.

C has effects of preventing oxidization of the molten alloy and enhancing the castability at the time of melting Ni base alloy containing high Cr; therefore it is preferable to add more C than the lower limit. However, it is not preferable if it exceeds the upper limit, because it becomes difficult to obtain sufficient corrosion resistance.

Mo has effect of improving corrosion resistance; therefore it is preferable to add it. However, it is not preferable if it exceeds the upper limit, because the melting point becomes high and therefore the aforementioned condition of the solidus-curve temperature cannot be met.

As the Ni base alloy of the aforementioned composition 2 which meets the condition of the aforementioned solidus-curve temperature and the condition of the aforementioned corrosion resistance, it is preferable that alloy (Alloy 2) consists essentially of: B: 1.0 to 5.0%, Si: 3.0 to 25.0%; Fe+Co: ≦15%, Mo+½W: ≦20%, C: ≦1.5%, V+Nb+Ta: ≦10%; Al: ≦1%, Cu: ≦3%, and the balance being Ni and inevitable impurities. The alloy of this composition is an alloy containing Ni—B—Si as essential elements, which does not contain C. The alloy of this composition is extremely excellent in corrosion resistance against hydrogen sulfide, low in melting point (solidus-curve temperature) (950 to 1150° C.), and excellent in wettability. Therefore, the alloy can be fusion-bonded to the build-up welded metal and the external layer steel pipe in an excellent manner.

Si is a very effective element for lowering corrosion resistance and melting point. If it is less than the lower limit, preferable corrosion resistance cannot be obtained. Furthermore, if it is less than the lower limit, melting point raises. Therefore, the aforementioned condition of the solidus-curve temperature cannot be met. Thus, it is not preferable. However, even if it exceeds the upper limit, corrosion resistance cannot be improved, and the material becomes very brittle.

Although B is an essential element to lower the melting point and keep the wettability at the time of fusion-bonding of the molten alloy, an excessive addition thereof exceeding the upper limit causes remarkably brittle material. On the other hand, if it is less than the lower limit, the aforementioned condition of the solidus-curve temperature cannot be met. Thus, it is not preferable.

With respect to the relation of Si and B, when B is low (when it is near the lower limit), it is preferable to lower the melting point by adjusting the Si content so as to close to the eutectic temperature.

Fe and Co are elements which can be used in place of Ni. They can be added up to a total of 15%. If they exceed the upper limit, problems may arise in corrosion resistance and therefore it is not preferable.

Mo, W, Al, Cu are not essential elements in the alloy of this composition. However, they are effective to improve corrosion resistance characteristics against corrosive component other than hydrogen sulfide.

Mo+½W can be added up to 20%. Al can be added up to 1%. Cu can be added up to 3%. Addition of Mo, W and Al exceeding the upper limit deteriorates the dissolution and castability of the alloy, and therefore it is not preferable. Furthermore, addition of Mo and W exceeding the upper limit raises the melting point and therefore it is not preferable. Addition of Cu exceeding the upper limit results in brittle alloy and therefore it is not preferable. Although V, Nb and Ta are used to fix bad effects of C, N and B, addition thereof exceeding the upper limit causes deterioration of melting and casting characteristics of the alloy, and therefore it is not preferable.

C improves the melting and casting characteristics of the alloy, and therefore it can be added up to 1.5%. However, it is difficult to dissolve C exceeding 1.5% in the alloy and the melting and casting characteristics deteriorate. Accordingly, it is preferable that the amount of C does not exceed the upper limit.

Inevitable impurities are elements such as P, S, O, Mg, Ca, Y and Ce. It is preferable that the amount of P, S, O, Mg, Ca, Y, Ce is equal to or less than (≦) 0.1%. Cr is preferably 0.2% or less. Mn is preferably equal to or less than (≦) 1%.

As Ni base alloy of the composition 2 which meets the condition of the aforementioned solidus-curve temperature and the condition of the aforementioned corrosion resistance, it is preferable that alloy (Alloy 3) consists essentially of: Cr: ≦25%, B: ≦1.7%, Si: 6 to 25%, Fe+Co: ≦15%, Mo+½W: ≦20%, C: ≦1.5%, V+Nb+Ta: ≦10%, Al: ≦1%, Cu: ≦3%, and the balance being Ni and inevitable impurities. The alloy of this composition is an alloy containing Ni—Si as essential elements. The alloy of this composition is extremely excellent in corrosion resistance against hydrogen sulfide, low in melting point (1,050 to 1,250° C.), and excellent in wettability. Therefore, the alloy can be fusion-bonded to the build-up welded metal and the external layer steel pipe in an excellent manner.

Si is a very effective element for lowering corrosion resistance and melting point. If it is less than the lower limit, preferable corrosion resistance cannot be obtained. Furthermore, if it is less than the lower limit, melting point raises. Therefore, the aforementioned condition of the solidus-curve temperature cannot be met. Thus, it is not preferable. However, even if it exceeds the upper limit, corrosion resistance cannot be improved, and the material becomes very brittle.

B is an effective element for lowering the melting point and enhancing the wettability of the alloy. However, when Cr is not larger than (≦) 25%, if B exceeds 1.7%, the corrosion resistance of the alloy remarkably deteriorates. In other words, if B is not larger than 1.7%, even if Cr changes within the range not larger than 25%, the corrosion resistance of the alloy does not change. However, if B exceeds 1.7%, the corrosion resistance remarkably deteriorates. Accordingly, in the case of adding B to lower the melting point of the alloy, the maximum amount is 1.7%. The above are the reasons of limiting the amount of B to be not larger than 1.7%.

When Cr is 0%, even if B exceeds 1.7%, the corrosion resistance of the alloy does not deteriorate. In this case, the composition of the alloy becomes the same as that of the aforementioned alloy 2.

Cr is an element which basically improves corrosion resistance and will be usually added for the purpose of improving corrosion resistance. However, when Si is 6 to 25% and B is 1.7% or less, even if the Cr amount changes within the range of 0% to 25%, the corrosion resistance against hydrogen sulfide does not change. In cases where Cr is added for the purpose of improving corrosion resistance against corrosive components other than hydrogen sulfide in atmosphere existing corrosive components other than hydrogen sulfide, the alloy of this component becomes very effective. If the Cr amount exceeds the upper limit, the melting point becomes higher, which becomes difficult to meet the aforementioned condition of the solidus-curve temperature, resulting in poor fusion bonding.

Fe and Co are elements which can be used in place of Ni. They can be added up to a total of 15%. If they exceed the upper limit, problems may arise in corrosion resistance and therefore it is not preferable.

Mo, W, Al, Cu are not essential elements in the alloy of this composition. However, they are effective to improve corrosion resistance characteristics against corrosive component other than hydrogen sulfide.

Mo+½W can be added up to 20%. Al can be added up to 1%. Cu can be added up to 3%. Addition of Mo, W and Al exceeding the upper limit deteriorates the dissolution and castability of the alloy, and therefore it is not preferable. Furthermore, addition of Mo and W exceeding the upper limit raises the melting point and therefore it is not preferable. Addition of Cu exceeding the upper limit results in brittle alloy and therefore it is not preferable.

Although V, Nb and Ta are used to fix bad effects of C, N and B, addition thereof exceeding the upper limit causes deterioration of melting and casting characteristics of the alloy, and therefore it is not preferable. It is preferable that Mn is not larger than (≦) 1%. Impurities are elements such as P, S, O, Mg, C, Y and Ce. It is preferable that P, S, O, Mg, C, Y or Ce is not larger than (≦) 1%.

Inconel 625, Inconel 725, Incoloy 825, Incoloy 925, Hastelloy C and Hastelloy C-276 are trade names and have the following compositions.

1. Inconel 625

Cr: 20.5 to 22.5%, Mo: 8.0 to 10.0% Fe: 2.0 to 3.0%, Si: ≦1.0%, Mn: ≦1.0%, another elements (Nb+Ta): 3.4 to 3.8%, and the balance being Ni and inevitable impurities;

2. Inconel 725

Cr: 20.0 to 22.0%, Mo: 8.0 to 9.0%, Fe: 7.0 to 8.0%, Ti: 1.3 to 1.7%, Si: ≦1.0%;

Mn: ≦1.0%, another elements (Nb+Ta): 3.3 to 3.7%, and the balance being Ni and inevitable impurities;

3. Incoloy 825
   Cr: 20.0 to 22.0%, Mo: 2.0 to 2.4%, Fe: 29.0 to 31.0%, Cu: 2.0 to 2.4%, Si: ≦1.0%;
   Mn: ≦1.0%, another element (Ti): 0.8 to 1.0%; and the balance being Ni and inevitable impurities;

4. Incoloy 925
   Cr: 20.0 to 22.0%, Mo: 2.0 to 4.0%, Fe: 27.0 to 29.0%, Cu: 1.6 to 2.0%,
   C: ≦0.01%, another element (Ti): 2.0 to 2.2%, Ni: 44.0%, and the balance being Ni and inevitable impurities;

5. Hastelloy C
   Cr: 15.5 to 17.5%, Mo: 16.0 to 18.0%, W: 3.75 to 5.25%, Fe: 4.5 to 7.0%, Co: ≦2.5%, Si: ≦1.0%, Mn: ≦1.0%, C: ≦0.12%, V: 0.2 to 0.4%, and the balance being Ni and inevitable impurities; and 6. Hastelloy C-276
   Cr: 14.5 to 16.5%, Mo: 15.0 to 17.0%, W: 3.0 to 4.5%, Fe: 4.0 to 7.0%, Co: ≦2.5%,
   Si: ≦0.05%, Mn: ≦1.0%, C: ≦0.02%, V: ≦0.35%; and the balance being Ni and inevitable impurities.

When pipes are connected to produce a transport pipe, the inner build-up welded portions (weirs) are welded. Although it is impossible to measure the wear status of the welded portion from the outside of the pipe in a nondestructive manner, it becomes possible to eliminate such measuring of the welded portion by using the material of the welded portion excellent in corrosion resistance superior to that of the material of the inner layer portion other than the welded portion. The corrosion resistance of the build-up welded portion (or ring) is superior to that of the fusion-bonded portion (area 4), and therefore the measuring of the welded portion can be eliminated. In other words, since the wearing amount of the build-up welded portion is fewer than that of the fusion bonded portion (area 4), even if it is impossible to measure the wear of the welded portion, it is possible to prevent occurrence of accidents due to the wear of this welded portion.

In the case of extending a pipe length by connecting pipes, the pipes are welded with the end surfaces abutted against each other. That is, in the pipe having the cross-sectional structure shown in FIG. 1, pipes are welded in a state in which the layers and build-up welded portions are abutted against each other respectively. In the case of the structure shown in FIG. 2, pipes are welded using welding material which is the same material as the welded portion in a state in which build-up welded portions are abutted against each other. In this case, the corrosion resistance can be restored by subjecting the welded portion to solution heat treatment after the welding.

Figure 8:
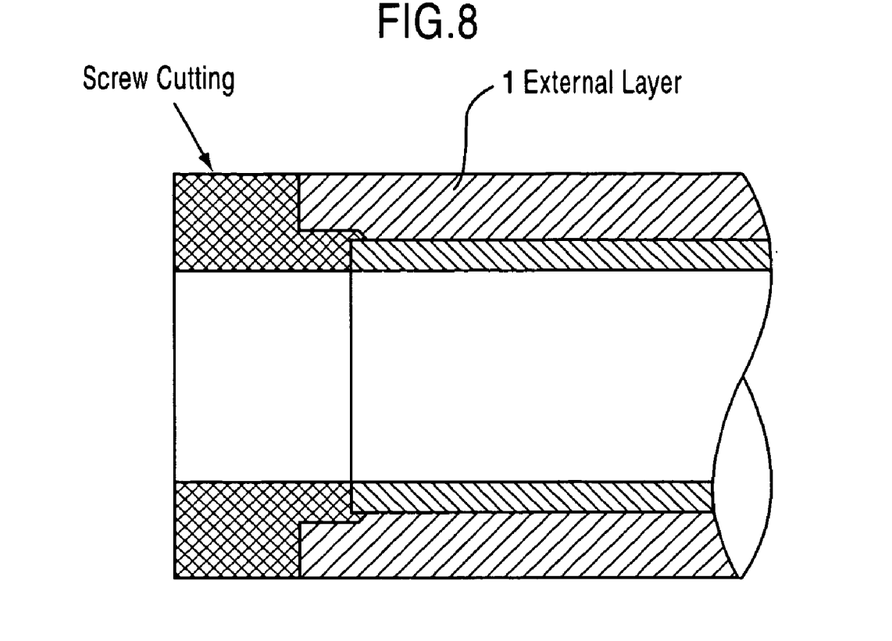
FIG. 8 is an explanatory cross-sectional view showing a screw cutting structure of a pipe.
Figure 9:
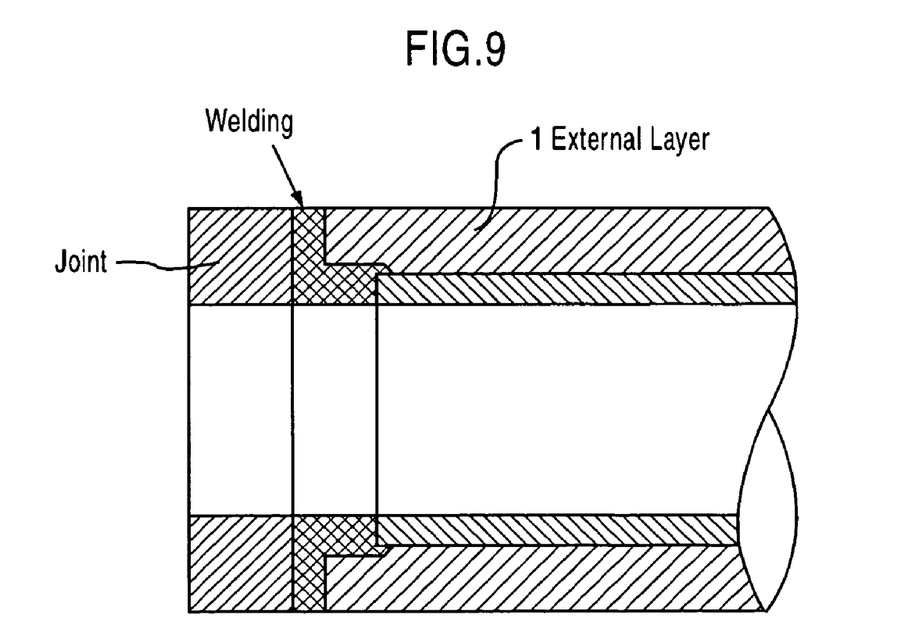
FIG. 9 is an explanatory cross-sectional view showing another screw cutting structure of a pipe.

In the case of using pipes according to the present invention as an oil well pipe, when cutting screw on the pipe end portions, the build-up welded portion can be made thicker in the radial direction as shown in FIG. 8 so that screw can be cut on the external peripheral surface of the build-up welded portion. Alternatively, as shown in FIG. 9, a connector which is the same material as that of the build-up welded portion can be welded to the pipe end so that screw can be cut on the external peripheral surface of the connector. Alternatively, a socket in which at least the inner surface layer is constituted by anticorrosive alloy can be used.

In this invention, "low alloy steel" denotes steel having compositions defined by the following items 1 to 5, i.e., C: ≦0.5%, Si: 0.15 to 0.35%, Mn: 0.3 to 1.7%, Ni: up to 4.5%, Cr: up to 3.5%, Mo: up to 1.0%, and small amount of active metal elements such as Nb, Ta, Ti and V as needed. (1.) All of nickel chrome molybdenum steel materials: JIS SNCM220, 240, 415, 420, 431, 439, 447, 616, 625, 630, 815; (2.) All of chrome molybdenum steel materials: JIS SCM415, 418, 420, 421, 430, 432, 435, 440, 445, 822; (3.) All of nickel chrome steel materials: JIS SNC236, SNC415, SNC631, SNC815, SNC836; (4.) All of H steel: SMn420H, SMn433H, SMn438H, SMn443H, SMn420H, SMn443H, SCr415H, SCr420H, SCr430H, SCr435H, SCr440H, SCM415H, SCM418H, SCM420H, SCM435H, SCM440H, SCM445H, SCM822H, SNC415H, SNC631H, SNC815H, SNCM220H, SNCM420OH; (5.) Etc.: STBA boiler steel pipes.

In order to prevent corrosion of the external layer surface of the clad pipe according to the present invention, it is effective to cover the external layer surface with resin such as polyethylene, epoxy resin and phenol resin. In the external layer pipe with the internal peripheral surface covered with alloy of the composition 2, the external layer pipe is exposed to high temperature and therefore the surface will be oxidized. To prevent the oxidization, it is effective to temporarily cover the external layer surface with molten sprayed coating such as Cr or heat-resisting steel coating, Cr plating, Al permeation treatment or coating in which clay, squamous metal, etc. are composed in heat resisting vehicle.

Figure 6:
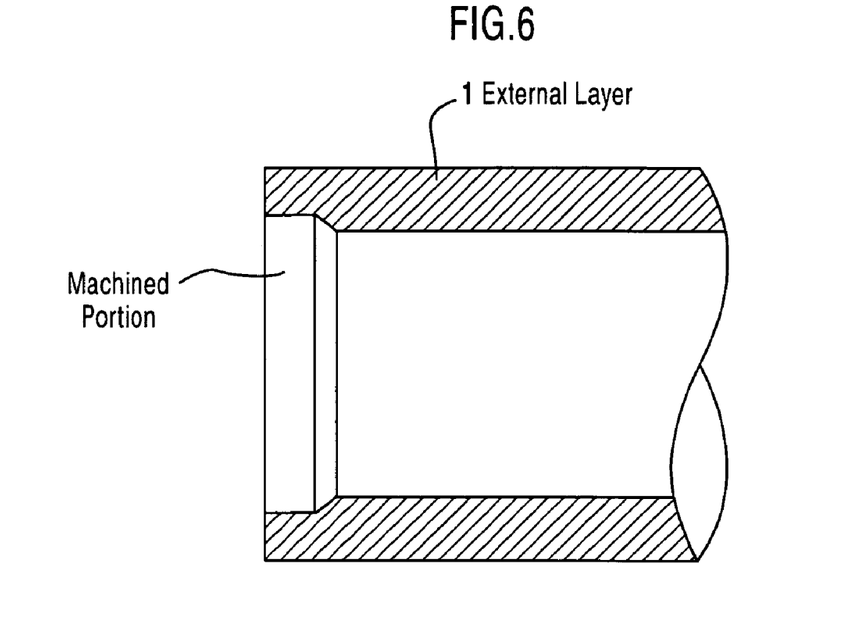
FIG. 6 is an explanatory cross-sectional view showing a welding portion of a pipe according to an embodiment of the present invention.
Figure 7:
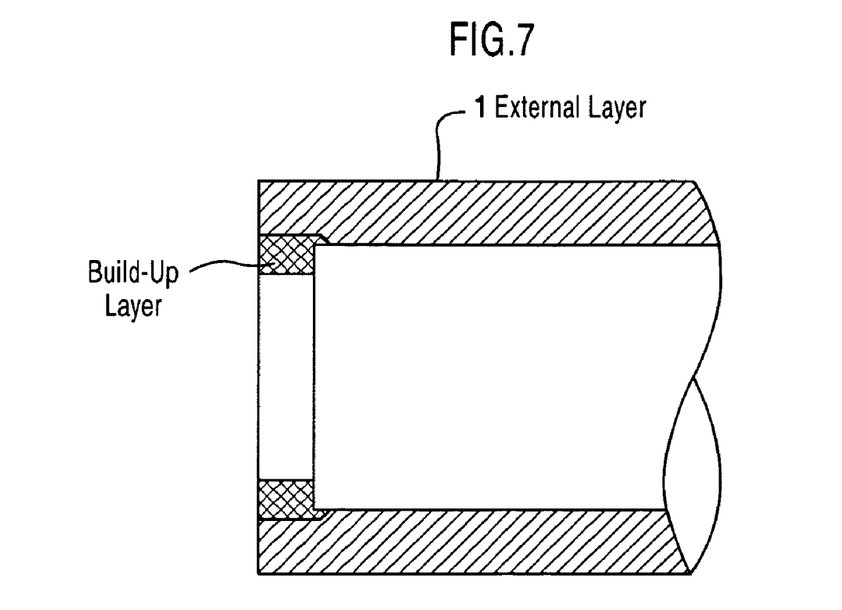
FIG. 7 is an explanatory cross-sectional view showing a machined build-up welded portion of the pipe.

An experiment ("Example 1") was conducted wherein, as an external layer steel pipe, carbon steel pipe for STKM13A mechanical structure of the following standard was used. The chemical compositions of the carbon steel pipe for STKM13A mechanical structure are as follows: C: ≦0.20%, Si: ≦0.35%, Mn: ≦0.60%, P: ≦0.04%, S: ≦0.04%. The external layer steel pipe was machined into external diameter of 315 mm, internal diameter of 275 mm, length of 2,000 mm. The inner peripheral end portion was machined as shown in FIG. 6, and Ni base alloy equivalent to Inconel 624 is build-up welded. After the build-up welding, as shown in FIG. 7, the end portion was machined (thickness of the build-up welded layer: 6 mm.) The pipe was laid horizontally, and the entire pipe was heated by induction heating to 1050° C. Then, the following molten alloy was injected into the inside of the pipe while rotating the pipe. The chemical composition of the molten alloy: Cr: 18%, C: 0.8%, B: 3.5%, Si: 4.0%, balance being Ni and inevitable impurities. The injection temperature of the molten alloy was 1,250° C., the solidus-curve temperature of the injected molten alloy was about 1,100° C., and the temperature difference between the build-up welded portion and the injected molten alloy was about 250° C. After the injection, while heating the entire pipe with the injected molten alloy by induction heating at the temperature of 1,150° C., the pipe was rotated for 2 minutes with the centrifugal force of 3 G or more. Thereafter, it was cooled gradually while rotating it.

The results of the nondestructive inspection of the joint status of the boundary portion are as follows. The joint portion was inspected with ultrasonic flaw detection from the outside of the pipe. No welding defect was observed. The solidified layer formed by the injected molten alloy had approximately a constant thickness of 4.5 to 5.5 mm. After the ultrasonic inspection, the boundary portion between the build-up welded layer and the injected molten alloy and five portions of the molten alloy and the external layer were cut, and the joint status and the thickness of the solidified layer was measured. No welding defect was observed. The actually measured value of the thickness of the solidified layer and the result of the ultrasonic inspection was matched. It was confirmed that in the pipe according to the present invention the wear status of the inner layer could be measured from the outside of the pipe.

A first corrosion test, example of alloy 1, ("Example 2") was conducted wherein Ni base alloys different in composition were disposed in atmosphere in which humidified hydrogen sulfide flowed for 48 hours. The weight change (increased weight) was investigated to perform corrosion resistance comparative tests. The size of test piece was 20×20×5 mm, the flowing rate of hydrogen sulfide was 100 milliliter/minute, time was 48 hours, and the temperature was room temperature. The composition of Ni base alloy (alloy 1) and the measured result of the increased weight amount due to corrosion are shown in Table 1.

TABLE 1

Weight change: μg/mm$^2$

| No. | Cr | B | Si | C | Fe, Co | Mo | Nb | Ni | Weight change | Remarks |
|---|---|---|---|---|---|---|---|---|---|---|
| 1 | 15 | 3.2 | 4.4 | 0.7 | Fe: 3.5 | | | Bal. | 5.210 | |
| 2 | 18 | 3.5 | 4.0 | 0.3 | Co: 3.0 | 16 | | Bal. | 1.680 | |
| 3 | 15 | 3.1 | 4.3 | 0.8 | Fe: 3.5 | | | Bal. | 3.110 | |
| 4 | 20 | 2.8 | 4.5 | 0.5 | Fe + Co: 8.0 | | | Bal. | 2.130 | |
| 5 | 25 | 4.0 | 2.5 | 0.6 | Co: 6.0 | 2.0 | | Bal. | 1.787 | |
| 6 | 32 | 4.3 | 3.5 | 0.9 | Fe: 2.0 | | | Bal. | 0.901 | |
| 7 | 37.1 | 3.6 | 3.4 | 0.6 | | 3 | | Bal. | 0.855 | |
| Comparative material 1 | 21.5 | 0 | 0.2 | | 2.5 | 9 | 3.6 | Bal. | 0.38 | Inco 628 welding |
| Comparative material 2 | 23.0 | 0 | 0.2 | | | 9 | 3.5 | Bal. | 0.620 | Inco 625 welding |

From the results shown in Table 1, it was confirmed that the Ni base alloy having the composition of alloy 1 was inferior in corrosion resistance to welding material for Inconel 625 (Inco 625 welding) and the rolling material (Inco 625 rolling) and met the conditions of the aforementioned corrosion resistance. It was also confirmed that the alloy having 30% or more of Cr was excellent in corrosion resistance as compared with another alloys. In the alloy of Nos. 1 to 7, the solidus-curve temperature was 1300° C. or less respectively, and was lower by 150° C. or more from the solidus-curve temperature of Inconel 625, Inconel 725, Hastelloy C-276. These alloys could have fusion bonded to the external layer steel pipe and the build-up layer steel pipe in a good manner.

A second corrosion test 2, example of alloy 2, ("Example 3") was conducted wherein Ni base alloys different in composition were disposed in atmosphere in which humidified hydrogen sulfide flowed for 48 hours. The weight change (increased weight) was investigated to perform corrosion resistance comparative tests. The size of test piece: 20×20×5 mm, the flowing rate of hydrogen sulfide was 100 milliliter/minute, the time was 48 hours, and the temperature was room temperature. The composition of Ni base alloy (alloy 2) and the measured result of the increased weight amount due to corrosion are shown in Table 2.

TABLE 2

Weight change: μg/mm$^2$

| No. | B | Si | C | Fe, Co | Mo | Nb | Al | Cu | Cr | Ni | Weight change |
|---|---|---|---|---|---|---|---|---|---|---|---|
| 1 | 5.0 | 3.0 | 0.1 | | | 4 | | | | Bal. | 1.02 |
| 2 | 3.0 | 6.0 | 0.1 | | | | | | | Bal. | 0.95 |
| 3 | 4.0 | 9.0 | 0.1 | | | | | | 0.1 | Bal. | 0.97 |
| 4 | 2.5 | 15.0 | 0.1 | | | | | | | Bal. | 0.93 |
| 5 | 3.0 | 25.0 | 0.2 | | | | | | | Bal. | 0.99 |
| 6 | 3.0 | 10.0 | 0.3 | Co: 3.0 | 1 | | 0.1 | | | Bal. | 0.94 |
| 7 | 1.0 | 13.0 | 0.4 | | | | | | | Bal. | 1.13 |
| 8 | 4.0 | 5.0 | 0.1 | Fe: 2.0 | | | | 2 | | Bal. | 1.21 |
| Comparative material 1 | 2.0 | 3.5 | 0.3 | 2.5 | | | | | 3.0 | Bal. | 2.15 |
| Comparative material 2 | 3.2 | 4.4 | 0.7 | 3.5 | | | | | 15 | Bal. | 5.21 |
| Comparative material 3 | 2.0 | 20.0 | | | | | | | 12 | Bal. | 2.34 |
| Comparative material 4 Inco 625 Welding | | 0.2 | | 2.5 | 9 | 3.6 | | | 21.5 | Bal. | 0.38 |
| Comparative material 5 Inco 625 rolling | | 0.2 | | | 9 | 3.6 | | | 23.0 | Bal. | 0.62 |

From the results shown in Table 2, it was confirmed that the Ni base alloy having the composition of alloy 2 was inferior in corrosion resistance to welding material for Inconel 625 (Inco625 welding) and the rolling material (Inco 625 rolling) and met the conditions of the aforementioned corrosion resistance. It was also confirmed that the alloy excellent in corrosion resistance as compared with comparative material containing Cr. In the alloy of Nos. 1 to 8, the melting point was low respectively, and the solidus-curve temperature was 1300° C. or less respectively, and was lower by 150° C. or more from the solidus-curve temperature of Inconel 625. These alloys could have fusion bonded to the external layer steel pipe and the build-up layer steel pipe in a good manner in the same manner as in Example 1.

A third corrosion test, example of alloy 3, ("Example 4") was conducted wherein Ni base alloys different in composition were disposed in atmosphere in which humidified hydrogen sulfide flowed for 48 hours. The weight change (increased weight) was investigated to perform corrosion resistance comparative tests. The size of the test piece was 20×20×5 mm, the flowing rate of the hydrogen sulfide was 100 milliliter/minute, the time was 48 hours, and the temperature was room temperature. The composition of Ni base alloy (alloy 3) and the measured result of the increased weight amount due to corrosion are shown in Table 3.

Nos. 1 to 13, the melting point was low respectively, and the solidus-curve temperature was 1300° C. or less respectively, and was lower by 150° C. or more from the solidus-curve temperature of Inconel 625. These alloys could have fusion bonded to the external layer steel pipe and the build-up layer steel pipe in a good manner in the same manner as in Example 1.

The present invention can be applied to an oil pipeline for crude oil or petroleum. Furthermore, it can also be used for petroleum boring. It also can contribute to the saving of rare metal resources such as Ni, Cr, Mo which are strategic materials.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

TABLE 3

Weight change: $\mu g/mm^2$

| No. | Cr | B | Si | C | Fe, Co | Mo | Nb | Al | Cu | Ni | Weight change |
|---|---|---|---|---|---|---|---|---|---|---|---|
| Comparative material 1 | 14 | 2.1 | 12.8 | | | | | | | Bal. | 1.80 |
| Comparative material 2 | 10 | 2.0 | 26.2 | | | | | | | Bal. | 3.12 |
| Comparative material 3 | 16 | 2.0 | 7.6 | | | | | | | Bal. | 1.83 |
| Comparative material 4 | 12.1 | 1.9 | 19.5 | | | | | | | Bal. | 2.34 |
| Comparative material 5 Inco 625 welding | 21.5 | | 0.2 | | | 2.5 | 9 | 3.6 | | Bal. | 0.38 |
| Comparative material 6 Inco 625 rolling | 23.0 | | 0.2 | | | | 9 | 3.5 | | Bal. | 0.62 |
| Comparative material 7 Inco 725 rolling | 21.0 | | 0.5 | | Fe: 7.5 | 8.5 | Nb + Ta: 3.4 Ti: 1.5 | | | Bal. | 0.583 |
| Comparative material 8 Hastelloy C-276 rolling | 15 | | 0.02 | | Fe: 5 Co: 1.3 | Mo: 16 W: 4 | V: 0.35 | | | Bal. | 0.651 |
| 1 | 14.1 | 0 | 19.2 | 0.1 | | | | | | Bal. | 0.99 |
| 2 | 15.9 | 0 | 13.2 | 0.2 | | | | | | Bal. | 0.68 |
| 3 | 18.0 | 0 | 6.6 | 0.2 | 3.5 | | | | | Bal. | 0.77 |
| 4 | 2.0 | 0 | 15.4 | 0.2 | | 10.0 | | 0.1 | | Bal. | 0.90 |
| 5 | 5.0 | 0 | 14.9 | 0.4 | | | | | | Bal. | 0.77 |
| 6 | 10.0 | 0 | 13.0 | 0.1 | | 3.0 | | | 2.0 | Bal. | 0.81 |
| 7 | 16.0 | 0 | 25.0 | 0.5 | | | | | | Bal. | 0.68 |
| 8 | 5.0 | 1.0 | 13.0 | 0.6 | 2.0 | | | | | Bal. | 1.14 |
| 9 | 10.0 | 1.0 | 13.0 | 0.1 | | 15.0 | | | | Bal. | 1.06 |
| 10 | 15.0 | 1.0 | 13.0 | | 7.0 | | | | | Bal. | 0.88 |
| 11 | 20.0 | 1.0 | 13.0 | 0.2 | | | | | | Bal. | 0.89 |
| 12 | 1.0 | 1.4 | 13.0 | | | | | | | Bal. | 1.16 |
| 13 | 20.0 | 1.6 | 15.0 | 0.1 | | 4.0 | | | | Bal. | 1.22 |

From the results shown in Table 3, it was confirmed that the Ni base alloy having the composition of alloy 3 was inferior in corrosion resistance to welding material for Inconel 625 (Inco625 welding) and the rolling material (Inco 625 rolling) and met the conditions of the aforementioned corrosion resistance. It was also confirmed that the alloy excellent in corrosion resistance as compared with comparative material containing 1.9% or more of B. In the alloy of While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A clad pipe, comprising:
    an external layer constituted by a carbon steel pipe or a low alloy steel pipe; and
    a Ni-based alloy coating layer, the coating layer coating an inner surface of the external layer,
    wherein each of both end portion areas of the coating layer is formed by a build-up welded layer of a first Ni-based alloy on the inner surface of the external layer,
    wherein an area of the coating layer other than the build-up welded layers is formed by a second Ni-based alloy layer fusion-bonded to the build-up welded layers and the inner surface of the pipe, a solidus-curve temperature of the second Ni-based alloy layer being 1300° C. or below and lower than a solidus-curve temperature of the first Ni-based alloy by 150° C. or more, and
    wherein the corrosion resistance against hydrogen sulfide of the first Ni-based alloy is equivalent to or superior to corrosion resistance against hydrogen sulfide of the second Ni-based alloy.

2. The clad pipe according to claim 1, wherein the second Ni-based alloy consists essentially of: Cr: 15 to 45%; B: 2.5 to 5.0%; Si: 2.0 to 5.0%; C: 0.2 to 1.5%; Mo: ≦20%; and the balance being Ni and inevitable impurities, wherein the percentages are by mass.

3. The clad pipe according to claim 2, wherein the second Ni base alloy consists essentially of: Cr: 30 to 40%; B: 3.0 to 5.0%; Si: 3.0 to 5.0%; C: 0.4 to 0.8%; Mo: 2 to 10%; and the balance being Ni and inevitable impurities, wherein the percentages are by mass.

4. The clad pipe according to claim 1, wherein the second Ni base alloy consists essentially of: B: 1.0 to 5.0%; Si: 3.0 to 25.0%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities, wherein the percentages are by mass.

5. The clad pipe according to claim 1, wherein the second Ni base alloy consists essentially of: Cr: 0 to 25%; B: 0 to 1.7%; Si: 6 to 25%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities, wherein the percentages are by mass.

6. The clad pipe according to claim 1, wherein the first Ni base alloy consists essentially of any one of the following compositions A to F, wherein the percentages are by mass:
    (Composition A) Cr: 20.5 to 22.5%; Mo: 8.0 to 10.0%; Fe: 2.0 to 3.0%: Si: ≦1.0%; Mn: ≦1.0%; Nb+Ta: 3.4 to 3.8%; and the balance being Ni and inevitable impurities;
    (Composition B) Cr: 20.0 to 22.0%; Mo: 8.0 to 9.0%; Fe: 7.0 to 8.0%: Ti: 1.3 to 1.7%: Si: ≦1.0%; Mn: ≦1.0%; Nb+Ta: 3.3 to 3.7%; and the balance being Ni and inevitable impurities;
    (Composition C) Cr: 20.5 to 22.5%; Mo: 2.0 to 2.4%; Fe: 29.0 to 31.0%: Cu: 2.0 to 2.4%: Si: ≦1.0%; Mn: ≦1.0%; Ti: 0.8 to 1.0%; and the balance being Ni and inevitable impurities;
    (Composition D) Cr: 20.0 to 22.0%; Mo: 2.0 to 4.0%; Fe: 27.0 to 29.0%: Cu: 1.6 to 2.0%; C: ≦0.01%; Ti: 2.0 to 2.2%; and the balance being Ni and inevitable impurities;
    (Composition E) Cr: 15.5 to 17.5%; Mo: 16.0 to 18.0%; W: 3.75 to 5.25%; Fe: 4.5 to 7.0%: Co: ≦2.5%; Si: ≦1.0%; Mn: ≦1.0%; C: ≦0.12%; V: 0.2 to 0.4%; and the balance being Ni and inevitable impurities; and
    (Composition F) Cr: 14.5 to 16.5%; Mo: 15.0 to 17.0%; W: 3.0 to 4.5%; Fe: 4.0 to 7.0%: Co: ≦2.5%; Si: ≦0.05%; Mn: ≦1.0%; C: ≦0.02%; V: ≦0.35%; and the balance being Ni and inevitable impurities.

7. The clad pipe according to claim 1, wherein an external peripheral surface of the clad pipe is coated with resin.

8. The clad pipe according to claim 1, wherein an external peripheral surface of the clad pipe is coated with heat-resisting and corrosion-resisting metal.

9. The clad pipe according to claim 1, wherein the clad pipe is a pipe to be used as an oil well pipe.

10. A clad pipe, comprising:
    an external layer constituted by a carbon steel pipe or a low alloy steel pipe;
    a ring metallurgically secured to an end portion of the pipe, the ring being made of a first Ni-based alloy and having an inner diameter smaller than an inner diameter of the external layer; and
    a coating layer made of a second Ni-based alloy, the coating layer coating an inner surface of the external layer and fusion-bonded to the inner surface of the external layer and a welding side end surface of the ring,
    wherein a solidus-curve temperature of the second Ni-based alloy is 1300° C. or below and lower then a solidus-curve temperature of the first Ni-based alloy forming the ring by 150° C. or more, and
    wherein the corrosion resistance against hydrogen sulfide of the first Ni-based alloy is equivalent to or superior to corrosion resistance against hydrogen sulfide of the second Ni-based alloy.

11. The clad pipe according to claim 10, wherein the second Ni base alloy consists essentially of: Cr: 15 to 45%;

B: 2.5 to 5.0%; Si: 2.0 to 5.0%; C: 0.2 to 1.5%; Mo: ≦20%; and the balance being Ni and inevitable impurities, wherein the percentages are by mass.

12. The clad pipe according to claim 11, wherein the second Ni base alloy consists essentially of: Cr: 30 to 40%; B: 3.0 to 5.0%; Si: 3.0 to 5.0%; C: 0.4 to 0.8%; Mo: 2 to 10%; and the balance being Ni and inevitable impurities, wherein the percentages are by mass.

13. The clad pipe according to claim 10, wherein the second Ni base alloy consists essentially of: B: 1.0 to 5.0%; Si: 3.0 to 25.0%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities, wherein the percentages are by mass.

14. The clad pipe according to claim 10, wherein the second Ni base alloy consists essentially of: Cr: 0 to 25%; B: 0 to 1.7%; Si: 6 to 25%; Fe+Co: 0 to 15%; Mo+½W: 0 to 20%; C: 0 to 1.5%; V+Nb+Ta: 0 to 10%; Al: 0 to 1%; Cu: 0 to 3%; and the balance being Ni and inevitable impurities, wherein the percentages are by mass.

15. The clad pipe according to claim 10, wherein the first Ni base alloy consists essentially of any one of the following compositions A to F, wherein the percentages are by mass:

(Composition A) Cr: 20.5 to 22.5%; Mo: 8.0 to 10.0%; Fe: 2.0 to 3.0%: Si: ≦1.0%; Mn: ≦1.0%; Nb+Ta: 3.4 to 3.8%; and the balance being Ni and inevitable impurities;

(Composition B) Cr: 20.0 to 22.0%; Mo: 8.0 to 9.0%; Fe: 7.0 to 8.0%: Ti: 1.3 to 1.7%: Si: ≦1.0%; Mn: ≦1.0%; Nb+Ta: 3.3 to 3.7%; and the balance being Ni and inevitable impurities;

(Composition C) Cr: 20.5 to 22.5%; Mo: 2.0 to 2.4%; Fe: 29.0 to 31.0%: Cu: 2.0 to 2.4%: Si: ≦1.0%; Mn: ≦1.0%; Ti: 0.8 to 1.0%; and the balance being Ni and inevitable impurities;

(Composition D) Cr: 20.0 to 22.0%; Mo: 2.0 to 4.0%; Fe: 27.0 to 29.0%: Cu: 1.6 to 2.0%;
C: ≦0.01%; Ti: 2.0 to 2.2%; and the balance being Ni and inevitable impurities;

(Composition E) Cr: 15.5 to 17.5%; Mo: 16.0 to 18.0%; W: 3.75 to 5.25%; Fe: 4.5 to 7.0%: Co: ≦2.5%; Si: ≦1.0%; Mn: ≦1.0%; C: ≦0.12%; V: 0.2 to 0.4%; and the balance being Ni and inevitable impurities; and (Composition F) Cr: 14.5 to 16.5%; Mo: 15.0 to 17.0%; W: 3.0 to 4.5%; Fe: 4.0 to 7.0%: Co: ≦2.5%; Si: ≦0.05%; Mn: ≦1.0%; C: ≦0.02%; V: ≦0.35%; and the balance being Ni and inevitable impurities.

16. The clad pipe according to claim 10, wherein an external peripheral surface of the clad pipe is coated with resin.

17. The clad pipe according to claim 10, wherein an external peripheral surface of the clad pipe is coated with heat-resisting and corrosion-resisting metal.

18. The clad pipe according to claim 10, wherein the clad pipe is a pipe to be used as an oil well pipe.

* * * * *